US006730185B2

(12) United States Patent
Kennedy

(10) Patent No.: US 6,730,185 B2
(45) Date of Patent: May 4, 2004

(54) ADHESIVE LEAFLET ASSEMBLIES

(75) Inventor: Michael Kennedy, Gates Mills, OH (US)

(73) Assignee: Rock Ridge Technologies Co., Willoughby, OH (US)

( * ) Notice: Subject to any disclaimer, the term of this patent is extended or adjusted under 35 U.S.C. 154(b) by 44 days.

(21) Appl. No.: 09/946,281

(22) Filed: Sep. 5, 2001

(65) Prior Publication Data

US 2003/0044560 A1 Mar. 6, 2003

(51) Int. Cl.[7] .......................... B44C 1/10; B32B 31/00; B32B 31/18; B32B 9/06; B42D 15/04

(52) U.S. Cl. ...................... 156/230; 156/267; 156/270; 156/301; 428/40.1; 428/77; 428/126; 428/192; 428/195; 428/202; 281/2; 283/81; 283/100; 283/106; 40/299.01

(58) Field of Search ................................ 156/230, 227, 156/267, 269, 270, 277, 301, 302, 516, 527, 250, 253, 268, 522, 299, 300, 290; 428/40.1, 45, 77, 124, 125, 130, 192, 194, 195, 126, 136, 202, 203; 281/1, 2, 5; 283/6.1, 81, 100, 105, 106; 40/306, 310, 312, 625, 299.01

(56) References Cited

U.S. PATENT DOCUMENTS 4,159,586 A 7/1979 Blum
4,637,633 A 1/1987 Instance
4,675,062 A 6/1987 Instance
4,744,591 A 5/1988 Instance
4,747,618 A 5/1988 Instance
4,850,612 A 7/1989 Instance
4,850,613 A 7/1989 Instance
4,894,106 A 1/1990 Instance
4,930,812 A 6/1990 Howard
4,933,043 A * 6/1990 Instance .................... 156/248
5,021,273 A 6/1991 Kobayashi
5,222,766 A 6/1993 Instance
5,262,214 A 11/1993 Instance
5,290,616 A * 3/1994 Cowan et al. ................ 428/40
5,399,403 A 3/1995 Instance
5,489,456 A 2/1996 Instance
5,605,730 A * 2/1997 Treleaven .................. 428/40.1
5,728,469 A * 3/1998 Mann et al. ................ 428/418
5,766,716 A 6/1998 Barry
5,846,623 A 12/1998 Denny
6,037,029 A 3/2000 Instance
6,057,019 A 5/2000 Barry

* cited by examiner

*Primary Examiner*—J. A. Lorengo
(74) *Attorney, Agent, or Firm*—Pearne & Gordon LLP

(57) ABSTRACT

An adhesive leaflet assembly is provided having a carrier web and a plurality of lengthwise oriented leaflet sub-assemblies releasably adhered on the web. The leaflet sub-assemblies have adhesive wing-like extensions that are oriented in a longitudinal direction relative to the carrier web. Longitudinal orientation of these wing-like extensions facilitates application of the leaflet sub-assemblies onto articles having a flat or planar surface in a high-speed continuous labeling operation. A method of providing a leaflet assembly, as well as a method for applying leaflet sub-assemblies are also provided.

26 Claims, 4 Drawing Sheets

FIG. 1.1

FIG. 6
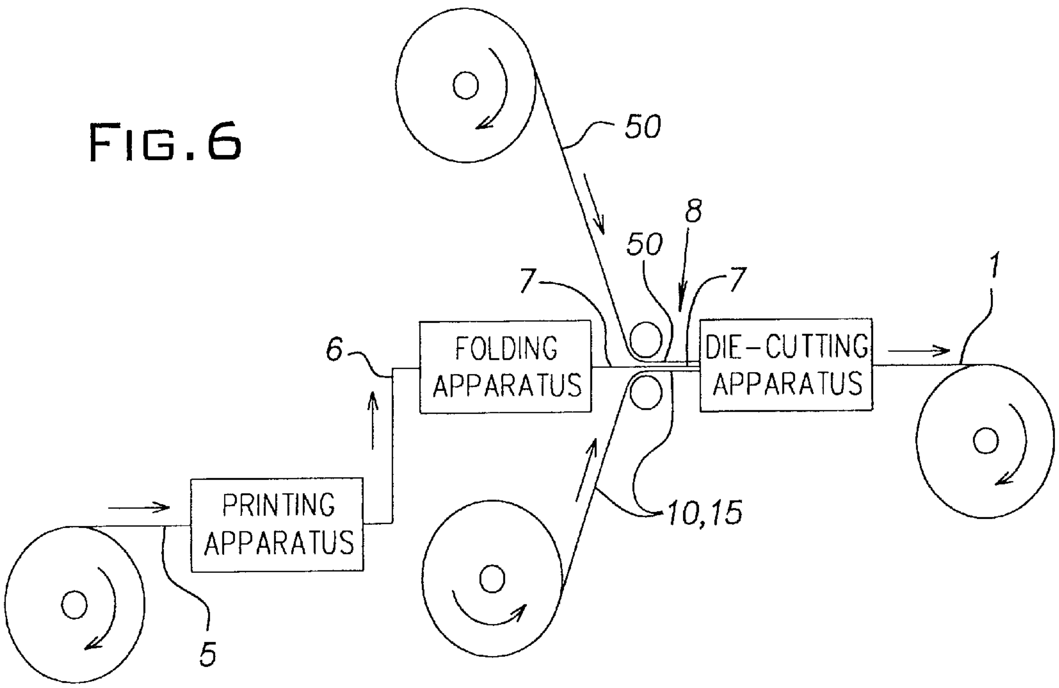
FIG. 8
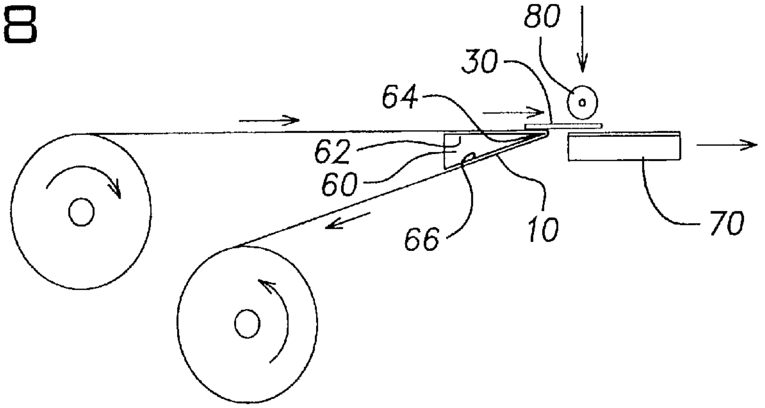
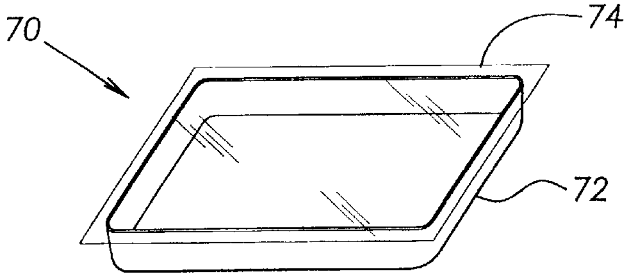
FIG. 9

ADHESIVE LEAFLET ASSEMBLIES

FIELD OF THE INVENTION

The present invention relates generally to labels and leaflets (hereinafter collectively "leaflet" or "leaflets") used with products, and more particularly, to adhesive leaflet assemblies for use with consumer products, especially food products.

BACKGROUND OF THE INVENTION

The use of adhesive leaflets attachable to consumer products is well known in the art. Very frequently, adhesive leaflets containing product warranties, product use instructions, discount coupons, advertisements, and the like are adhered to consumer products. Such leaflets are often provided as leaflet sub-assemblies which are manufactured on a sheet of substrate material. The leaflet sub-assemblies are releasably adhered to the substrate until they are removed to be attached to consumer products.

Most often, the substrate has at least two layers: a carrier web and a release coating. The carrier web traditionally is a thin, paper-like layer, and the release coating is a waxy, silicone or polymeric substance that is applied to at least one face of the paper-like carrier web by means such as spraying, brushing, laminating, etc.

The above-described adhesive leaflet sub-assemblies generally include the following layers or elements: a first film-like layer, a multi-sheet leaflet and a second film-like layer. The first film-like layer, which is typically made from polypropylene, is coated with an adhesive substance on its back face or underneath side and on its front face or top side. The second film-like layer, which is also typically made of polypropylene, is coated with an adhesive substance only on its back face or underneath side. The leaflet sub-assembly, in its assembled form, is configured so that the leaflet is sandwiched between the adhesive bearing front face of the first polypropylene layer and the adhesive-bearing back face of the second polypropylene layer. A rear sheet of the leaflet flatly rests against the front face of the first polypropylene layer, and the adhesive-bearing back face of the second polypropylene layer flatly and securely rests against a front sheet of the leaflet. The leaflet has a smaller area than the two polypropylene layers, allowing them to contact and adhere to each other at an overlapping portion around the perimeter of the leaflet. These adhesive leaflet assemblies are manufactured and arranged in a single column on a strip of the substrate carrier web by a process depicted schematically in FIG. 1. Paper suitable for printing and having a width in excess of that of the carrier web (hereinafter "leaflet stock") is unwound from a feed roll and fed into a printing apparatus. The printing apparatus can print on both sides of the leaflet stock. The leaflet stock is then fed to a folding apparatus where it undergoes a two-step folding process to produce, for example, a double-folded form sheet leaflet. This leaflet is then fed to a rolling apparatus where it is simultaneously joined with the first and second polypropylene layers as above described. The first polypropylene layer can have been pre-applied to the release coating of the carrier web prior to this operation. During this joining process, the carrier web, with its release coating, and the second polypropylene layer are joined to the double-folded leaflet so that the back face of the back sheet of the leaflet contacts the adhesive on the front face of the first polypropylene layer. Additionally, the second polypropylene layer is joined to the double-folded leaflet, and to the overlapping portion of the first polypropylene layer. The adhesive on the rear face of the second poly-propylene layer contacts the front face of the front sheet of the leaflet and the adhesive substance on the front face of the overlapping portion of the first polypropylene layer. Subsequently, the first and second polypropylene layers and the leaflet, but not the carrier web or the release coating, are subjected to a die-cutting operation whereby a series of cuts made proximate to folded edges of the leaflet and at lines demarcating printed and unprinted areas of the leaflet make it possible for portions of the first and second polypropylene layers and the unprinted portions of the leaflet to be separated from the carrier web and release coating and for the leaflet sub-assemblies, including wing-like extensions of the first and second polypropylene layers, to remain attached to the carrier web and release coating. The carrier web along with the leaflet sub-assemblies is wound up into a roll or folded into a fan-fold stack arrangement (as shown in FIG. 1.1) to form a leaflet assembly for storage and later use.

In use, the die-cut adhesive leaflet assembly carrier strip is fed to and manipulated by mechanical devices designed to cause the leaflet sub-assemblies first to become separated from the carrier web strip and second to become transferred and adhered to consumer products. As diagrammatically shown in FIG. 2, the rolled up carrier strip comprising the carrier web and the leaflet sub-assemblies is fed to a wedge-shaped structure. The carrier web is drawn around a tip or knife edge of the wedge-shaped structure to cause an abrupt change in the direction of travel of the carrier web. This abrupt change, in combination with the stiffness of the leaflet sub-assemblies, causes the leaflet sub-assemblies, and more specifically, the first polypropylene layers thereof, to peel away from the release coating of the carrier web and to become entrained in a vacuum air flow induced by and into an air box apparatus. Once entrained in the vacuum air flow, the leaflet sub-assemblies are drawn toward and briefly held against a perforated plate portion of the air box so that the upper face or top side of the leaflet sub-assembly rests against the perforated plate. The vacuum air flow is suddenly stopped and an air flow inducted by and out of the air box pushes the leaflet sub-assembly downwardly away from the perforated plate and into contact with a product or package that passes beneath the perforated plate.

While the just described adhesive sub-assembly is well suited for a wide variety of consumer products, it is not acceptable for use with prepared and prepackaged food products, especially those products that are sold frozen and subsequently heated in a microwave oven prior to eating. Very frequently, frozen food products are sold in a box that contains a microwavable, open-top tray or dish-like structure into which the food has been placed. The open top of the tray or dish-like structure is covered and sealed by a tightly drawn piece of microwavable film that either wholly or partially remains affixed to the structure while the food contents are microwave heated. It has been found that, when informational leaflets are provided with such frozen food products, it is best to have the leaflet sub-assemblies adhered to the film cover, and it is desirable to be able to leave the leaflet sub-assemblies on the film while the food is being heated. It is also necessary to provide leaflet sub-assemblies that, when they are peeled off the film cover by the consumer, do not leave any portion(s) of the sub-assemblies behind. Leaflet sub-assemblies that have first and second film-like layers made of polypropylene are unacceptable in these respects, because polypropylene, when exposed to microwaves, releases offensive odors and potentially hazardous substances. In addition, the first film-like polypropylene layer tends to remain adhered to the tray film covering when the leaflet is removed from it.

U.S. Pat. No. 4,930,812 issued to Howard (hereinafter the "Howard patent") and U.S. Pat. No. 5,846,623 issued to Denny (hereinafter the "Denny patent") teach a second type of adhesive leaflet sub-assembly. The type of adhesive leaflet sub-assemblies disclosed by the Howard patent and the Denny patent are structurally simpler than the first type described above. Generally, the type of sub-assembly taught by the Howard patent and the Denny patent comprises a multi-sheet leaflet and only one film-like layer. The single film-like layer is coated with an adhesive substance on its back face. The multi-sheet leaflet includes a front sheet, a back sheet slightly longer than the front sheet and connected to the front sheet along a first transverse fold line, a first further sheet connected to the back sheet along a second transverse fold line, and a second further sheet connected to the first further sheet along a third transverse fold line. The first and second further sheets are disposed between the front and back sheets, and the leaflet sub-assembly, in its assembled form, is configured so that the leaflet first sheet is in contact with the adhesive-bearing back face of the film-like layer.

An adhesive leaflet assembly containing a mass quantity of these sub-assemblies is made by placing a series of strips of the leaflets upon a release coating of a paper carrier web so as to cause the strips to extend transversely of the carrier web. The leaflet strips comprise the leaflets and intermediate bands or portions that serve to connect the leaflets together. The film-like layer, which is a transparent web, is then placed over the carrier web and the strips of leaflets so that the front sheets of the leaflets and the exposed surface portions of the carrier web adhere to it. Additionally, since the back sheets of the leaflets are slightly longer than the front sheets, a narrow margin of the first further sheets projects beyond the free edge of the front sheets and becomes lightly adhered to the transparent web. This assembly of the carrier web, strips and transparent web is subjected to a die-cutting operation in which the strips and transparent web, but not the carrier web, are cut along a series of lines about each and every leaflet, leaving each leaflet attached to the carrier web by two strips of the transparent web, extending beyond the fold lines of the leaflet and transversely relative to the carrier web. The transparent web is then pulled away from the carrier web, taking with it the intermediate bands or portions, but leaving a rectangle of the transparent web material over each leaflet. The carrier web is then slit lengthwise into multiple strips carrying a succession of leaflet sub-assemblies. Each strip with its leaflet sub-assemblies adhered thereto can be rolled up for storage. When the strip assembly is used, it is applied to a leaflet sub-assembly transfer device where the strip is led around a guide presenting a relatively small radius guide surface to the rear face of the carrier web. As the sub-assembly passes over the guide, the relative stiffness of the sub-assembly and transparent web material cause the sub-assembly to become parted from the strip so that the adhesive rear face of the leading edge portion of the panel of the transparent web material covering the leaflet, which leading edge portion runs transversely relative to the strip, is exposed. Simultaneously, the article to which the leaflet sub-assembly is to be applied is moved past the guide and the sub-assembly is thereby transferred to the article as it peels from the strip.

While the leaflet sub-assemblies taught by the Howard patent and the Denny patent may be said to address at least one of the shortcomings of the first type of sub-assembly, i.e., they do not have a first film-like layer that can be left behind on the tray covering film, the Howard and Denny leaflet sub-assemblies are not oriented on their carrier web in a manner that makes them well suited for application to a flat, tightly drawn covering film. Instead, the Howard and Denny leaflet sub-assemblies are oriented on their carrier web so that they may be readily applied to cylindrically shaped food containers such as cans. In view of the foregoing background, it should be evident that a need exists for a method of making adhesive leaflet assemblies that include adhesive leaflet sub-assemblies which can be readily applied to and safely remain on frozen food packaging while the food is heated in a microwave oven and which can be fully and completely removed from the packaging thereafter.

SUMMARY OF THE INVENTION

The present invention is a structure for an adhesive leaflet assembly and leaflet sub-assemblies, as well as a method for making and using the adhesive leaflet assembly and the adhesive leaflet sub-assemblies with consumer products, and more particularly, with prepared food products that are cooked or warmed by the consumer in a microwave oven. The adhesive leaflet assembly comprises: a strip-like, transparent carrier web having a release coating and a plurality of adhesive leaflet sub-assemblies arranged in a column lengthwise of said carrier web. The sub-assemblies include a leaflet having a front sheet, a back sheet, and at least one further sheet disposed between the front sheet and the back sheet, and an adhesive sheet having a layer of adhesive provided on a back side thereof. The sub-assemblies further have a first wing-like extension and a second wing-like extension, the first wing-like extension adjoining a first transverse edge of said leaflet, the second wing-like extension adjoining a second transverse edge of said leaflet, the first wing-like extension and the second wing-like extension having a portion of the layer of adhesive provided on the back side or underneath surface of the adhesive sheet and securing the leaflet to the carrier web, and the first wing-like extension and the second wing-like extension being disposed longitudinally, or lengthwise, relative to the carrier web.

The method of the present invention generally entails the steps of: placing a preprinted and pre-folded strip of leaflet stock, having a front sheet, a back sheet and at least one further sheet disposed between the first and second sheets upon a thermoplastic carrier web provided with a release coating; applying to the strip of leaflet stock a polyester adhesive sheet so as to contact the front sheet of the strip of leaflet stock with a layer of an adhesive provided on a side surface of the polyester adhesive sheet, and so as to further contact the layer of the adhesive with an edge of the at least one further sheet of the leaflets (the thermoplastic carrier web, the release coating, the leaflets and the polyester adhesive sheet collectively comprising the adhesive leaflet assembly); die-cutting through the adhesive sheet and the leaflet stock of the adhesive leaflet assembly, but not through the homogeneous lamina of the adhesive leaflet assembly, so as to produce a first cut portion of the polyester adhesive sheet and the strip of leaflet stock and a plurality of second cut portions of the polyester adhesive sheet and the strip of leaflet stock and to leave the leaflets secured to the to the carrier web by a first longitudinally extending, wing-like band of the second cut portions of the polyester adhesive sheet and by a second longitudinally extending, wing-like band of the second cut portions of said polyester adhesive sheet, the first longitudinally extending band and the second longitudinally extending band respectively adjoining a first longitudinally extending edge of the leaflets and a second longitudinally extending edge of the leaflets (the second cut portions of the polyester adhesive sheet, the leaflets and the first and second longitudinally extending bands of the second cut portions collectively comprising the plurality of adhesive leaflet sub-assemblies); removing the first cut portion of the polyester adhesive sheet and leaflet stock from the carrier web of the adhesive leaflet assembly; winding up into a roll or fan folded stack the carrier web and the adhesive leaflet sub-assemblies; placing the rolled or fan folded assembly on an apparatus for transferring the adhesive leaflet sub-assemblies to a plurality of articles; drawing the carrier web and the adhesive leaflet sub-assemblies about a guide member included with said transferring apparatus and thereby causing the first longitudinally extending band and the second longitudinally extending band of the second cut portions of the adhesive sheet of the adhesive leaflet sub-assemblies to part with the carrier web and to expose the adhesive included on the first longitudinally extending band and the second longitudinally extending band of the second cut portions of the adhesive sheet of the adhesive leaflet sub-assemblies; and moving the articles past the guide member of the transferring apparatus so as to cause the adhesive leaflet sub-assemblies to the transferred to the articles by a roller means.

Accordingly, it is an object of the present invention to provide a method for making and using an adhesive leaflet assembly and a plurality leaflet sub-assemblies for use with prepared food products that are cooked or warmed in a microwave oven, wherein the leaflet assembly includes a film-like, strip-shaped carrier web made of polypropylene or polyester instead of a conventional paper carrier web to which the leaflet sub-assemblies are detachably secured.

It is another object of the present invention to provide a method for making and using an adhesive leaflet assembly and a plurality of adhesive leaflet sub-assemblies for use with prepared food products that are cooked or warmed in a microwave oven, wherein instead of the adhesive leaflet sub-assemblies being detachably secured to a paper carrier web and a release coating by a transparent web, that extend lengthwise relative to the carrier web and two opposing transverse opposing folded edges of a leaflet included in the leaflet sub-assemblies, the adhesive leaflet sub-assemblies are detachably secured to a film-like, strip-shaped carrier web made of polypropylene or polyester by two strips of a polyester adhesive sheet that extend longitudinally, or lengthwise, relative to the film-like, strip shaped carrier web and adjacent to two opposing transverse folded edges of a leaflet included in each of the leaflet sub-assemblies.

It is yet another object of the present invention to provide a less complicated method for making an adhesive leaflet assembly and a plurality of adhesive leaflet sub-assemblies for use with prepared food products that are cooked and warmed in a microwave oven, wherein rather than placing a plurality of leaflet strips transversely upon a release coating of a paper web carrier and later slitting a web carrier along its length into multiple strips carrying a succession of leaflet sub-assemblies, a folded strip of printed leaflet stock is placed lengthwise upon a film-like, strip shaped carrier web and is die-cut to produce a columnar plurality of leaflet sub-assemblies and to thereby eliminate any slitting operation.

It is still a further object of the present invention, to provide a method for making and using an adhesive leaflet assembly and a plurality of adhesive leaflet sub-assemblies for use with prepared food products that are cooked or warmed in a microwave oven, wherein adhesive leaflet sub-assemblies made of thinner, lighter weight and less rigid heat resistant materials than those materials used for heretofore known adhesive leaflet sub-assemblies can be used.

It is also an object of the present invention, to provide a method for making and using an adhesive leaflet assembly and a plurality of adhesive leaflet sub-assemblies for use with prepared food products that are cooked or warmed in a microwave oven, wherein an adhesive leaflet sub-assembly is separated from a film-like, strip shaped carrier web made of polypropylene or polyester more readily and reliably than from a paper carrier web.

These and other objects of the present invention will become more readily apparent by referring to the accompanying drawings and to the detailed description of the invention provided hereinbelow.

BRIEF DESCRIPTION OF THE DRAWINGS

FIG. 1.1 diagrammatically shows a fan-fold stack of an adhesive leaflet assembly according to the invention.

FIG. 6 diagrammatically illustrates the method of the present invention insofar as the method relates to making the adhesive leaflet assembly and the adhesive leaflet sub-assembly shown in FIGS. 3 and 4, respectively.

FIG. 8 diagrammatically illustrates the method of the present invention insofar as the method relates to using the adhesive leaflet assembly and the adhesive leaflet sub-assembly shown in FIGS. 3 and 4 respectively.

FIG. 9 diagrammatically illustrates a microwave tray having a hollow, open-topped container portion and a covering film layer to which an invented leaflet sub-assembly may be applied.

DETAILED DESCRIPTION OF THE INVENTION

Figure 3:
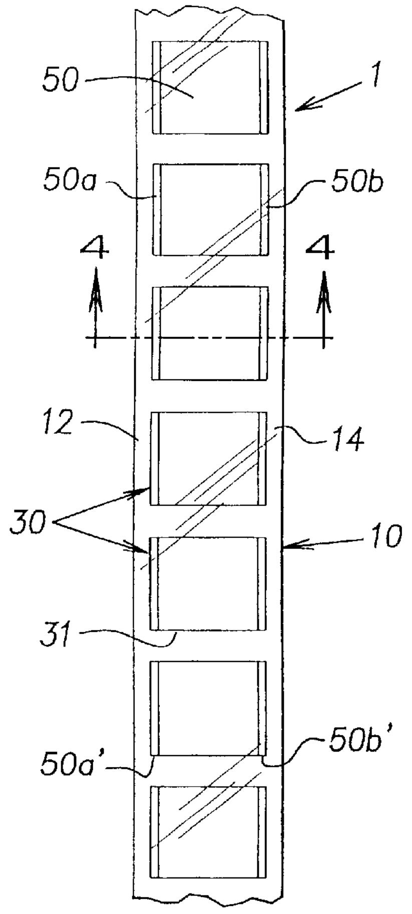
FIG. 3 shows a top view of an adhesive leaflet assembly made and used according to the method of the present invention.

An adhesive leaflet assembly made in accordance with the method of the present invention is indicated generally by the reference number 1 in FIG. 3. The assembly includes a strip-like carrier web 10 provided on its front face or top side 15 with a release coating 20. Preferably, the carrier web 10 is a thin, transparent, film-like structure made of polypropylene. The carrier web 10 can alternatively be made of polyester.

Figure 4:
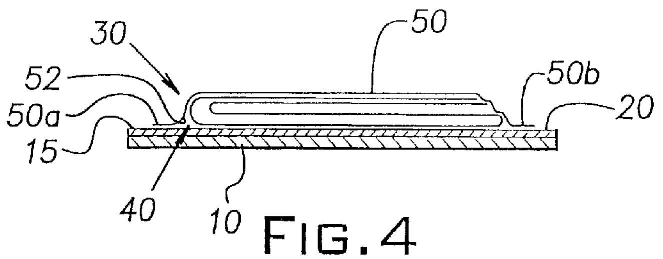
FIG. 4 shows a cross sectional view, taken along the line 4—4 of FIG. 3, of an adhesive leaflet sub-assembly made and used according to the method of the present invention.
Figure 5:
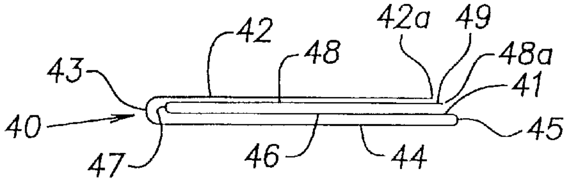
FIG. 5 shows an end view of a leaflet made by and used with the method of the present invention.

The adhesive leaflet assembly 10 further includes a plurality of adhesive leaflet sub-assemblies 30. The adhesive leaflet sub-assemblies 30 are arranged in a single column along the length of the carrier web 10 so that they rest flatly upon the top side 15 of the carrier web 10 and the release coating 20. As most clearly shown in FIG. 4, the adhesive leaflet sub-assemblies 30 are comprised of a leaflet 40 and an adhesive sheet 50. As most clearly shown in FIG. 5, the leaflet 40 preferably includes a front sheet 42, a back sheet 44, a first intermediate sheet 46 and a second intermediate sheet 48 disposed between the front sheet 42 and the back sheet 44. The front sheet 42 and the back sheet 44 are joined by a first fold 43. The first intermediate sheet 46 is joined to the back sheet 44 by a second fold 45, and the second intermediate sheet 48 is joined to the first intermediate sheet 46 by a third fold 47. The folds 43, 45 and 47 extend transversely relative to the sheets 42, 44, 46 and 48 of the leaflet 40, and longitudinally, or lengthwise, relative to the carrier web 10. The leaflet 40 is produced from a single sheet of flat leaflet stock 5 that is folded generally according to a two- or three-step folding process as described above. The folding process is carried out so that the edge 48*a* of the second intermediate sheet 48 lies inwardly relative to the second fold 45 and thereby exposes a transversely extending portion 41 on the top side of the first intermediate sheet 46, and further so that the edge 42*a* of the front sheet 42 lies inwardly relative to the edge 48*a* thereby exposing a transversely extending portion 49 on the top side of the second intermediate sheet 48. The purpose for folding the leaflet 40 in this manner will become evident from subsequent discussion.

The adhesive sheet 50 of the leaflet sub-assemblies 30 is preferably made of a transparent heat resistant polyester substance. The polyester sheet 50 is coated on its back face or underneath surface 52 with a layer of adhesive (not shown). The adhesive-bearing, underneath surface 52 of the sheet 50 makes contact with the front face of leaflet 40 (or top surface of the front sheet 42), with the transversely extending portions 41 and 49 and with the margins 12 and 14 of the carrier web 10.

Figure 7:
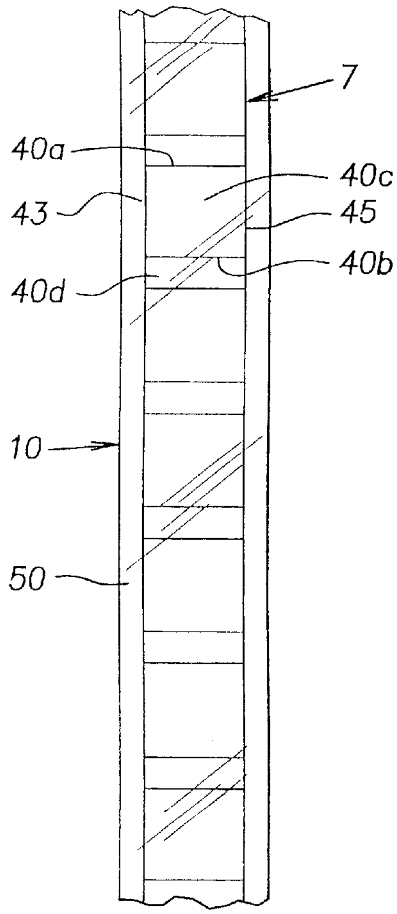
FIG. 7 shows one of the interim stages of making the adhesive leaflet assembly shown in FIG. 3.

FIG. 6 illustrates the method of the present invention insofar as it relates to making the adhesive leaflet assembly 1 and the adhesive leaflet sub-assemblies 30. A strip of unfolded leaflet stock 5 having a width in excess of the width of the carrier web 10 undergoes the two-sided printing process described hereinabove. The printed leaflet stock 6 then undergoes a two- or three-stage folding operation like the operation described above to produce a continuous, four- or eight-sheet strip of printed and double- or tri-folded leaflet stock 7. The four-sheet strip of double-folded leaflet stock 7 is configured so that it includes the sheets 42, 44, 46 and 48, the folds 43, 45 and 47, and the transversely extending portions 41 and 49 of the above described leaflets 40. The strip of double-folded leaflet stock 7 is then fed to the carrier web strip 10, and as the back or bottom sheet of the leaflet stock makes contact with the front face of the carrier web 10, a strip of the polyester sheet 50, having a width substantially the same as the width of the carrier web 10, is applied to the front or top sheet of the leaflet stock 7 and to the edge portions of the front face of the carrier web 10, that are not covered by the leaflet stock 7. FIG. 7 illustrates how the carrier web 10, the four-sheet strip of the double-folded leaflet stock 7 and the polyester sheet 50 appear at this stage of the process.

Returning to FIG. 6, a strip 8 comprising the web 10, the leaflet stock 7 and the polyester sheet 50 are then fed to a die-cutting apparatus where the polyester sheet 50 and the leaflet stock 7, but not the carrier web 10 or the release coating 15, are subjected to a die-cutting operation whereby a series of cuts made proximate to the folded edges 43 and 45 of the leaflet stock 7 and at lines 40*a* and 40*b* (demarcating printed 40*c* and unprinted 40*d* areas of the leaflet stock 7) make it possible for portions of the polyester sheet 50 and the unprinted portions 40*d* of the leaflet stock to be separated from the carrier web 10 and the release coating 15. The leaflet sub-assemblies 30, including the longitudinally extending (relative to the carrier web 10) wing-like extensions 50*a* and 50*b* comprised of the polyester sheet 50 remain attached to the carrier web 10 and the release coating 15 following this die cutting operation. Following the die cutting and waste separating steps, the adhesive leaflet assembly 1 is either wound up into a roll or folded into a fan-fold stack arrangement for storage and later use.

Figure 1:
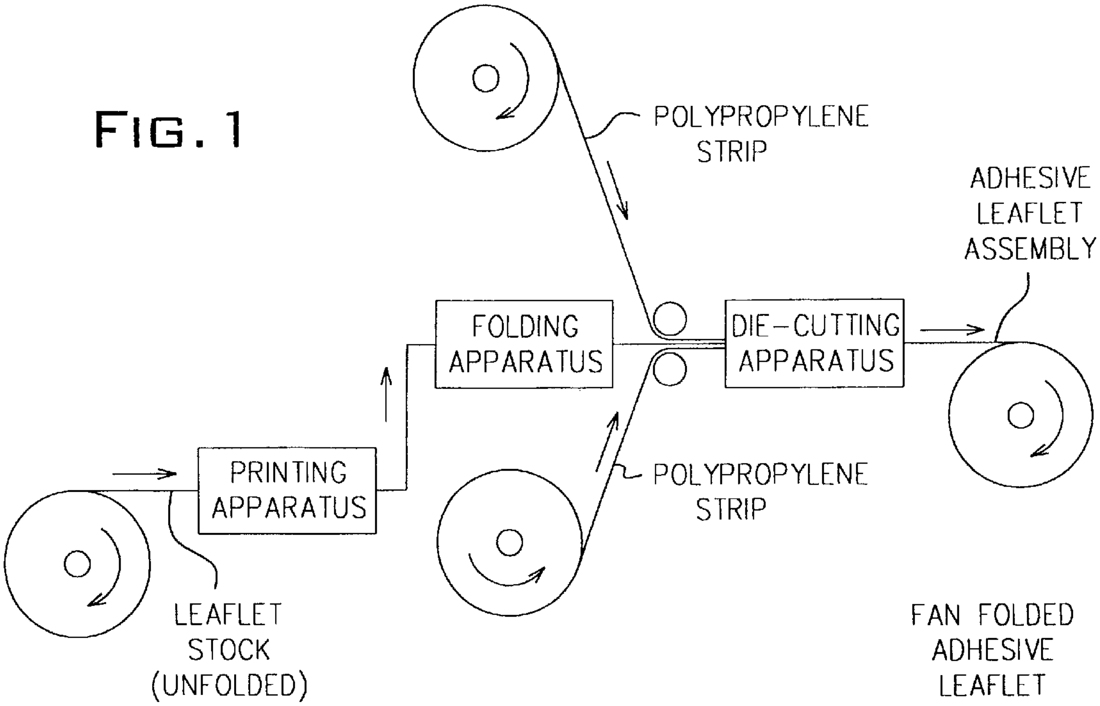
FIG. 1 diagrammatically shows a known method for making an adhesive leaflet assembly.
Figure 1:
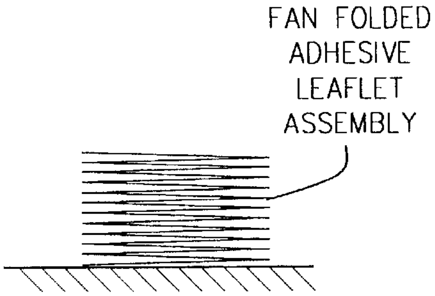

FIG. 8 illustrates the method of the present invention insofar as it relates to using the adhesive leaflet assembly 1 and the adhesive leaflet sub-assemblies 30. The adhesive leaflet assembly 1 is fed, either from a roll or a fan-folded stack (see FIG. 1) to a wedge-shaped, or knife-edged guide member 60. The guide member 60 includes a top, or guide surface 62, a tip, or abruptly changing contour surface 64 and a bottom surface 66. Upon being fed to the guide member 60, the adhesive leaflet assembly 1 is first drawn across the guide surface 62 until the leading edge 31 of one of the adhesive leaflet sub-assemblies 30 is directly above the abruptly changing contour surface 64. At this point, the greater stiffness of the adhesive leaflet sub-assembly 30 relative to the carrier web 10 causes the leaflet sub-assembly 30, and more particularly, the leading edges 50*a*' and 50*b*' of the wing-tike extension 50*a* and 50*b* to begin to peel away from the carrier web 10. As the carrier web 10 is further drawn around the contour surface 64 and along the bottom surface 66 of the guide member 60, the leaflet sub-assembly 30 continues to separate from the carrier web 10 and is caused to extend outwardly away from the surface 64 and toward a package or product 70. The package 70, which is caused to move relative to guide member 60 by known means, can be, for example, a microwave food tray or package having a hollow, open-topped container portion 72 and a covering film layer 74 which has been drawn tightly across the top of the container 72 and sealed by known means, as shown in FIG. 9. As the adhesive leaflet sub-assembly 30 continues to travel toward the package 70, the leading edges 50*a*' and 50*b*' of the wing-like extensions 50*a* and 50*b*, and more specifically, the adhesive-bearing bottom face of these extensions make contact with the outside surface of the product or package 70 and are pressed firmly against the package surface by a rolling means 80 which maintains continuous contact with the outer surface (surface without adhesive) of the polyester sheet 50 of the sub-assembly 30 during transfer. As the package 70 continues its journey past the guide member 60, the portions of the wing-like extensions 50*a* and 50*b*, located aft of the extension leading edges 50*a*' and 50*b*' also make contact with the outside surface of the package 70 and are firmly pressed against the package by the roller 80 until the entire adhesive leaflet sub-assembly 30 is secured to the package surface. In the case where package 70 is a microwavable food product container as shown in FIG. 9, the surface to which the sub-assembly 30 is transferred and the wing-like extensions 50*a* and 50*b* adhered is preferably the covering film layer 74. After the leaflet sub-assembly 30 is secured to the package, the application process is repeated for another package and another leaflet sub-assembly 30.

The polyester adhesive sheet 50 used according to the method of the present invention, has been found to be especially well suited for use with microwavable packages containing frozen foods that are cooked and/or warmed in a microwave oven. Unlike the polypropylene sheet material used with prior art adhesive leaflet sub-assemblies, the polyester sheet material used with the leaflet sub-assemblies 30 does not produce offensive odors or harmful substances when it is exposed to microwave radiation in a microwave oven. Moreover, the leaflet sub-assemblies 30 neither include nor require a second adhesive sheet and hence they do not involve any risk of a second adhesive sheet being left behind on the cover layer 74 of a microwavable food tray. Accordingly, it should be evident that the method of the present invention makes it possible to produce and use adhesive leaflet sub-assemblies that overcome the problems posed by prior art leaflet sub-assemblies.

Additionally, by producing the adhesive leaflet sub-assemblies 30 having wing-like extensions 50*a* and 50*b* that extend longitudinally, or lengthwise, relative to the carrier web 10 and by using a wedge-shaped guide member 60 to separate the sub-assemblies 30 from the carrier web 10, the invented adhesive leaflet sub-assemblies can be applied successively in continuous fashion to packages in an assembly line having a flat surface more efficiently and effectively than prior art techniques, particularly for microwavable or frozen food packages. This is due, at least in part, to the fact that longitudinal orientation of wing-like extensions 50*a* and 50*b* allows adhesion of the leaflet sub-assembly to its package continuously along the sub-assembly's entire length as it is peeled from the carrier web 10. This prevents flapping, folding, or other distortion of the sub-assembly that may occur in a high speed labeling process if the sub-assembly were not continuously adhered to its target package along its entire length during application. It has also been found that with the lengthwise orientation of the wing-like extensions 50*a* and 50*b* and of the portions 41 and 49 of the leaflet 40, it is possible to produce the leaflets 40 from lighter weight leaflet stock and at the same time ensure that the adhesive leaflet sub-assemblies are stiffer than prior art sub-assemblies.

While a preferred embodiment of the invention has been described above, it will be recognized and understood that various modifications may be made thereto and the appended claims are intended to cover all such modifications that may fall within the spirit and scope of the invention.

What is claimed is:

1. A method for making an adhesive leaflet assembly comprising the steps of:

a) placing a strip of leaflet stock having a plurality of printed portions upon a carrier web;

b) applying an adhesive sheet having a layer of adhesive on a back side thereof strip of leaflet stock such that said adhesive layer contacts said leaflet stock and said carrier web and is releasably adhered to said carrier web;

c) die-cutting said adhesive sheet and said strip of leaflet stock to produce substantially in-register label portions of said adhesive sheet and said leaflet stock, said label portions being encircled by substantially in-register cut-away portions of said adhesive sheet and said leaflet stock, said label portions containing said printed portions of said leaflet stock and being secured to said carrier web by wing-like extensions of said label portions of said adhesive sheet, said wing-like extensions extending beyond said label portions of said strip of leaflet stock in a perpendicular direction relative to a longitudinal direction of said carrier web, wherein associated in-register label portions of said adhesive sheet and said leaflet stock cooperate to form an adhesive leaflet sub-assembly; and d) removing said cut-away portions from said carrier web to form said adhesive leaflet assembly, said assembly comprising said carrier web and a plurality of said adhesive leaflet sub-assemblies releasably adhered thereto, each said sub-assembly thereby comprising an adhesive sheet adhered to a leaflet, said leaflet comprising a first uppermost sheet and a second subjacent sheet located beneath and immediately adjacent said first uppermost sheet, said adhesive sheet having an adhesive coating on a bottom surface thereof and being adhered to said leaflet via said adhesive coating, said adhesive sheet extending beyond said leaflet, thereby forming two wing-like extensions of said adhesive sheet on two opposite side of said leaflet, wherein adjacent at least one edge of said leaflet, said uppermost sheet has a first sheet edge lying entirely inward of a second sheet edge of said subjacent sheet thereby exposing a transversely extending portion of said subjacent sheet, said transversely extending portion being in contact with said adhesive layer on said bottom surface of adhesive sheet along the entire length of said transversely extending portion.

2. A method according to claim 1, further comprising the step of collecting said adhesive leaflet assembly into a roll.

3. A method according to claim 1, further comprising the step of collecting said adhesive leaflet assembly into a fan-folded stack.

4. A method according to claim 1, wherein said adhesive sheet is made of polyester.

5. A method according to claim 1, wherein said carrier web is made of polypropylene.

6. A method according to claim 1, wherein said carrier web is made of polyester.

7. A method according to claim 1, said sub-assemblies being oriented in at least one column at spaced intervals on said carrier web in a longitudinal direction relative thereto.

8. An adhesive leaflet assembly comprising:

a carrier web; and a plurality of adhesive leaflet sub-assemblies arranged in at least one column on said carrier web in a longitudinal direction relative thereto, each of said adhesive leaflet sub-assemblies comprising a leaflet and an adhesive sheet adhered to said leaflet, said leaflet comprising a first uppermost sheet and a second subjacent sheet located beneath and immediately adjacent said first uppermost sheet, said adhesive sheet having an adhesive coating on a bottom surface thereof and being adhered to said leaflet via said adhesive coating, said adhesive sheet extending beyond said leaflet in a direction perpendicular to said longitudinal direction of said carrier web, thereby forming two wing-like extensions of said adhesive sheet on either side of said leaflet, each of said wing-like extensions having its longest dimension in a longitudinal direction relative to said carrier web, wherein adjacent at least one edge of said leaflet, said uppermost sheet has a first edge lying entirely inward of a second edge of said subjacent sheet thereby exposing a transversely extending portion of said subjacent sheet, said transversely extending portion being in contact with said adhesive layer on said bottom surface of adhesive sheet along the entire length of said transversely extending portion, and wherein each of said sub-assemblies is releasably adhered to said carrier web by said adhesive coating on said bottom surface of said wing-like extensions.

9. An assembly according to claim 1, wherein said adhesive sheet is polyester.

10. An assembly according to claim 1, wherein said carrier web is transparent.

11. An assembly according to claim 1, wherein said carrier web is made of polypropylene or polyester.

12. An assembly according to claim 1, wherein said leaflet is a dual-fold leaflet having 4 sheets or a tri-fold leaflet having 8 sheets.

13. An adhesive leaflet sub-assembly comprising a leaflet and an adhesive sheet adhered to said leaflet, said leaflet comprising a first uppermost sheet and a second subjacent sheet located beneath and immediately adjacent said first uppermost sheet, said adhesive sheet having an adhesive coating on a bottom surface thereof and being adhered to said leaflet via said adhesive coating, said adhesive sheet extending beyond said leaflet thereby forming two wing-like extensions of said adhesive sheet on two opposite side of said leaflet, wherein adjacent at least one edge of said leaflet, said uppermost sheet has a first sheet edge lying entirely inward of a second sheet edge of said subjacent sheet thereby exposing a transversely extending portion of said subjacent sheet, said transversely extending portion being in contact with said adhesive layer on said bottom surface of adhesive sheet along the entire length of said transversely extending portion.

14. A sub-assembly according to claim 13, wherein said adhesive sheet is polyester.

15. A sub-assembly according to claim 14, wherein said sub-assembly does not produce harmful substances when exposed to microwave radiation in a microwave oven.

16. A sub-assembly according to claim 14, wherein said sub-assembly does not produce offensive odors when exposed to microwave radiation in a microwave oven.

17. A sub-assembly according to claim 13, wherein said leaflet is a dual-fold leaflet having 4 sheets, or a tri-fold leaflet having 8 sheets.

18. A sub-assembly according to claim 17, wherein said leaflet is a dual-fold leaflet having 4 sheets including a front sheet, a back sheet, and first and second intermediate sheets disposed between said front and back sheets, said front and back sheets being joined at a first fold, said first intermediate and back sheets being joined at a second fold, and said first and second intermediate sheets being joined at a third fold.

19. An adhesive leaflet sub-assembly comprising a leaflet and an adhesive sheet adhered to said leaflet, said leaflet being a dual-fold leaflet having 4 sheets including a front sheet, a back sheet, and first and second intermediate sheets disposed between said front and back sheets, said front and back sheets being joined at a first fold, said first intermediate and back sheets being joined at a second fold, and said first and second intermediate sheets being joined at a third fold, said adhesive sheet having an adhesive coating on a bottom surface thereof and being adhered to said leaflet via said adhesive coating, said adhesive sheet extending beyond said leaflet thereby forming two wing-like extensions of said adhesive sheet on two opposite side of said leaflet, said front sheet having a front sheet edge lying entirely inward of a second intermediate sheet edge of said second intermediate sheet thereby exposing a transversely extending portion of said second intermediate sheet, said second intermediate sheet edge lying entirely inward of said second fold thereby exposing a transversely extending portion of said first intermediate sheet, each of said transversely extending portions being in contact with said adhesive layer on said bottom surface of adhesive sheet along the entire length of the respective transversely extending portion.

20. A sub-assembly according to claim 14, wherein said polyester adhesive sheet is 0.05–0.4 mm thick.

21. An assembly according to claim 1, said wing-like extensions of said adhesive sheet being longitudinally co-extensive with said leaflet.

22. A sub-assembly according to claim 13, said wing-like extensions of said adhesive sheet being longitudinally co-extensive with said leaflet.

23. A method of applying an adhesive leaflet subassembly to an article from an adhesive leaflet assembly according to claim 1, the method comprising the steps of:

a) drawing said carrier web having said adhesive leaflet sub-assemblies about a guide member thereby causing said wing-like extensions of said polyester film layer to disengage from said carrier web and to expose said adhesive layer initially at a leading edge of each of said extensions;

b) moving said article past said guide member such that said leading edges of said wing-like extensions contact and are adhered to said article; and c) transferring said leaflet sub-assembly to said article by continuing to adhere said wing-like extensions to said article progressively along their entire length as they become peeled off of said carrier web via said guide member.

24. A method according to claim 23, wherein said guide member includes an abruptly changing contour defined by a guide surface of said guide member.

25. A method according to claim 24, wherein said abruptly changing contour is a wedge-shaped contour or a post shaped contour.

26. A method according to claim 23, wherein said leaflet sub-assembly is transferred to said article by pressing said sub-assembly against said article by a roller means.

* * * * *

UNITED STATES PATENT AND TRADEMARK OFFICE

CERTIFICATE OF CORRECTION

PATENT NO. : 6,730,185 B2
DATED : May 4, 2004
INVENTOR(S) : Michael Kennedy

It is certified that error appears in the above-identified patent and that said Letters Patent is hereby corrected as shown below:

Title page,
Item [56], References Cited, U.S. PATENT DOCUMENTS, please delete "5,728,469 A" and insert therefor -- 5,725,469 A --.

Figure 2:
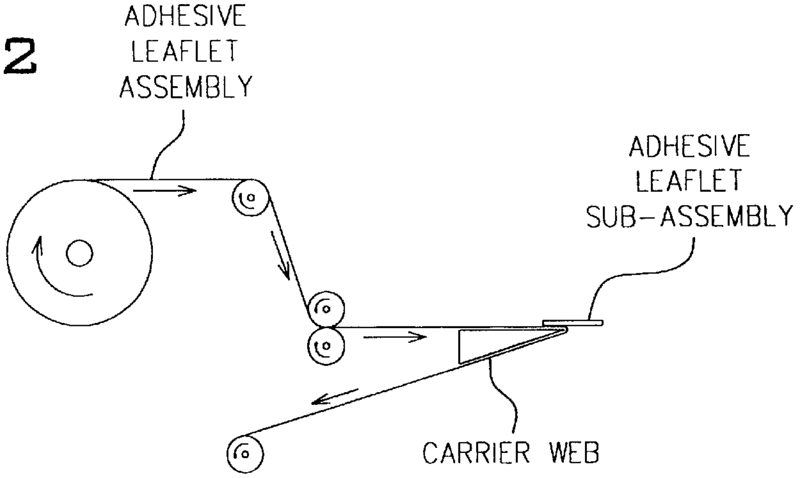
FIG. 2 diagrammatically shows a known method for using an adhesive leaflet assembly made according to the method shown in FIG. 1 and for applying an adhesive leaflet sub-assembly included in the assembly to a package.
Figure 2A:
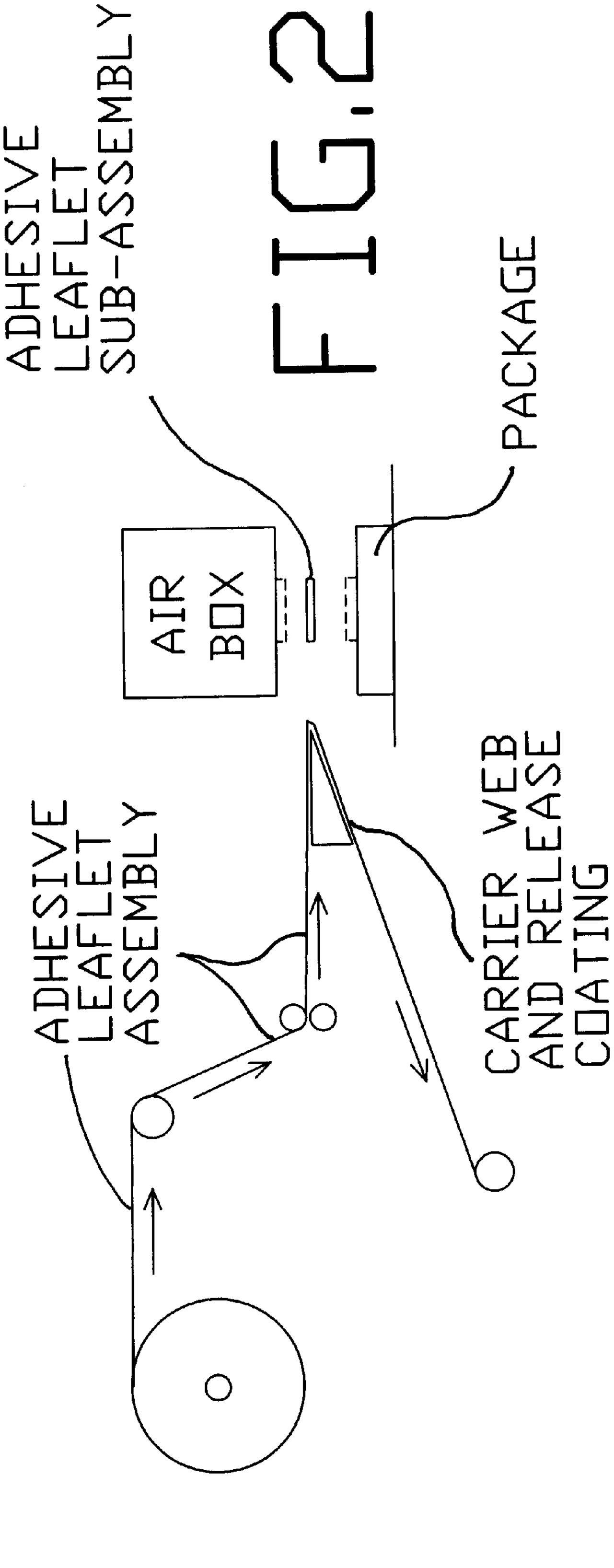
Figure 2B:
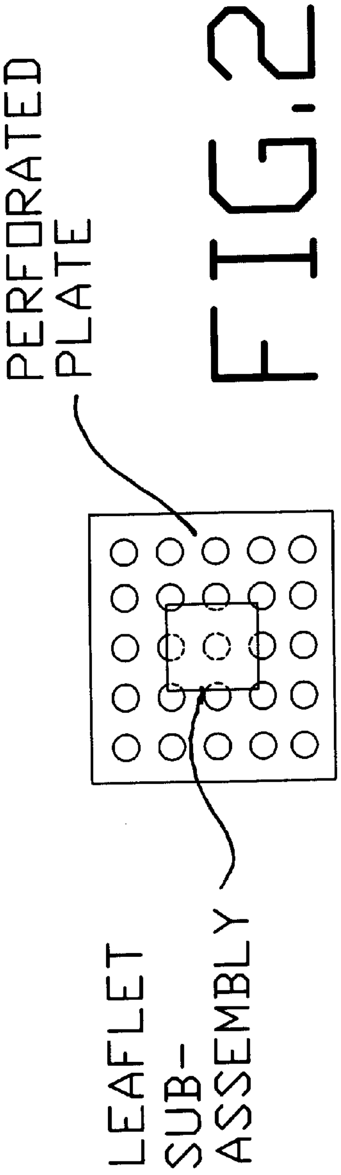

Drawings,
Please delete sheet 2 of 4 (Figs. 2A and 2B).

Column 9,
Line 47, after "on a back side therefor" please add -- to said --.

Column 10,
Line 66, please delete "claim 1" and insert therefor -- claim 8 --.

Column 11,
Lines 1, 3 and 5, please delete "claim 1" and insert therefor -- claim 8 --.

Signed and Sealed this

Fourteenth Day of September, 2004

JON W. DUDAS
*Director of the United States Patent and Trademark Office*